US007201504B2

(12) United States Patent
Collot et al.

(10) Patent No.: US 7,201,504 B2
(45) Date of Patent: Apr. 10, 2007

(54) OPTICAL MODULE FOR A LIGHTING DEVICE FOR MOTOR VEHICLE, DESIGNED TO GIVE AT LEAST ONE MAIN CUT-OFF BEAM

(75) Inventors: Patrice Collot, Bobigny (FR); Etienne Pauty, Bobigny (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 11/336,542

(22) Filed: Jan. 20, 2006

(65) Prior Publication Data

US 2006/0164851 A1 Jul. 27, 2006

(30) Foreign Application Priority Data

Jan. 21, 2005 (FR) .................................. 05 00669

(51) Int. Cl.
*B60Q 1/00* (2006.01)
*F21V 11/00* (2006.01)
*F21V 21/00* (2006.01)

(52) U.S. Cl. ...................... 362/538; 362/514; 362/539; 362/545

(58) Field of Classification Search ................ 362/538, 362/539, 514, 543–545, 280, 319, 322, 282, 362/323, 301
See application file for complete search history.

(56) References Cited

U.S. PATENT DOCUMENTS

| | | | | |
|---|---|---|---|---|
| 2,228,476 | A | 1/1941 | Murray | |
| 3,223,246 | A | 12/1965 | Daitch | |
| 5,264,993 | A * | 11/1993 | Neumann et al. | 362/510 |
| 6,015,220 | A | 1/2000 | Blusseau | |
| 6,425,683 | B1 * | 7/2002 | Kusagaya et al. | 362/512 |
| 2003/0021119 | A1 * | 1/2003 | Blusseau et al. | 362/277 |
| 2003/0223246 | A1 * | 12/2003 | Albou | 362/539 |

FOREIGN PATENT DOCUMENTS

| | | |
|---|---|---|
| DE | 100 30 362 | 1/2002 |
| EP | 1 197 387 | 4/2002 |
| FR | 2 769 688 | 4/1999 |
| FR | 2 840 389 | 12/2003 |
| JP | 2003-242811 | 8/2003 |
| WO | WO 2004/085917 | 10/2004 |

OTHER PUBLICATIONS

European Patent Office—Patent Abstracts of Japan for JP 2003-242811.

(Continued)

*Primary Examiner*—Renee Luebke
*Assistant Examiner*—Evan Dzierzynski
(74) *Attorney, Agent, or Firm*—Morgan & Finnegan, LLP

(57) ABSTRACT

An optical module for an automobile lighting device adapted to selectively emit a principal light beam generated from a principal light source for performing a principal lighting function and a secondary light beam generated from a secondary light source for performing a secondary lighting function. The optical module having a fixed or retractable shield for providing a principal lighting function such as a main beam with or without a cut-off. The optical module further including a retractable reflecting mirror movable from a retracted position, where the mirror does not substantially interfere with the principal light beam, to a working position in which the reflecting mirror is substantially centered on the optical axis of the optical module and oriented so as to give, from light rays issuing from the secondary source, a secondary beam constituting the secondary lighting function.

16 Claims, 3 Drawing Sheets

OTHER PUBLICATIONS

Dialog English Language Abstract for DE 100 30 362.
Dialog English Language Abstract for FR 2 840 389.
Dialog English Language Abstract for FR 2 769 688.
French Search Report for corresponding Application No. 05 00 669.
English Language Abstract for WO 2004-085917.
Dialog English Language Abstract for EP 1 197 387.

* cited by examiner

OPTICAL MODULE FOR A LIGHTING DEVICE FOR MOTOR VEHICLE, DESIGNED TO GIVE AT LEAST ONE MAIN CUT-OFF BEAM

FIELD OF THE INVENTION

The invention relates to an optical module that can be integrated in an automobile lighting device of the headlight type, a module designed to give at least one principal cut-off lighting beam and having an optical axis, a headlight of the type that comprises:

a reflector of the elliptical type having an internal focus and an external focus on the optical axis;

a principal light source disposed in the vicinity of the internal focus;

a shield having a cut-off edge in the vicinity of the external focus;

a lens, in particular a convergent lens, situated in front of the shield and having a focal plane in the vicinity of the external focus;

and a secondary light source, disposed between the shield and the lens, for performing a secondary lighting function.

BACKGROUND OF THE INVENTION

An optical module of this type, known from FR-A-2 840 389, produces an infrared secondary lighting beam in a zone situated above the cut-off, by means of a diffuser fixed to the front face of the shield. The area of illumination of the secondary beam is situated essentially above the optical axis and is off-center with respect to this axis.

It is desirable to be able to perform other secondary functions, in particular a town lamp function or a DRL (Day Running Light) function in a headlight with an elliptical module with cut-off, for example a dipped headlight or a fog light. In the case of a town lamp or a DRL, the illumination grid, that is to say the zone illuminated on a screen situated at a given distance from the headlight and orthogonal to the optical axis, must be rectangular, centered on the optical axis between given limits.

SUMMARY OF THE INVENTION

The aim of the invention is in particular to provide a headlight with a principal lighting beam with cut-off, which fulfills at least one supplementary secondary function of the town lamp or DRL type, without interfering with the principal function.

According to the invention, an optical module of the type defined above comprises a retractable reflecting mirror able to pass from a retracted position, where the mirror does not substantially interfere with the principal beam, to a working position in which the reflecting mirror is situated in the vicinity of the focal plane of the lens, substantially centered on the optical axis and oriented so as to give, from light rays issuing from the secondary source, a secondary beam, preferably substantially centered on the optical axis, and constituting the secondary lighting function.

Within the meaning of the invention, it will be understood that the light rays “issuing” from the secondary source may reach the reflecting mirror directly and/or indirectly (that is to say possibly having previously undergone at least one modification of their initial path, for example through at least one prior reflection on another reflective surface).

This beam is preferably in conformity with a substantially rectangular illumination grid.

The reflecting mirror can be substantially planar, in particular rectangular. The large side of the reflecting mirror can be substantially horizontal.

According to a first possibility, the shield of the headlight is fixed and the reflecting mirror, in its working position, is situated in front of the shield.

According to another possibility, the shield is mounted so as to be able to move, in translation or rotation, and is retracted so as to allow the placing of the reflecting mirror in the working position.

The fact that the shield is mounted so as to be able to move makes it possible to confer on the optical module several so-called principal functions with the same light source: it is possible to provide a shield which, in the removed/retracted position, makes it possible to obtain a beam without cut-off of the main beam type and which, in a working position, makes it possible to obtain at least one beam with cut-off of the dipped beam or fog beam type or other beam with cut-off defined by the new functions referred to as AFS, Advanced Front Systems. It is also possible to have, as principal functions, a dual function dipped/main beam module for example, or a multifunction module, the principal functions to which there is added the secondary function peculiar to the invention. Examples of movable shields making it possible to obtain at least two different principal functions are for example described in the patent FR 04/06273 filed on Sep. 6, 2004, with a shield having an “active” edge composed of a set of distinct portions, at least part of one of the portions of the set of portions participating in the production of at least two different cut-offs of the light beam emitted by the said light source, or the patent EP 1 197 387.

For example, the principal source may generate a beam of the main beam type with the shield in position and the reflecting mirror in both retracted positions (that is to say both inactive vis-a-vis light rays emitted by the principal source). The reflecting mirror can then be placed in front of the shield or be integrated in it.

The module according to the invention is therefore able to emit at least one principal beam with cut-off, in particular chosen from amongst the dipped and fog beams. It is also capable of generating another principal beam with or without cut-off, in particular of the main beam type.

According to the invention, the secondary function is preferably a town and/or DRL lamp function.

The secondary source can be situated in the vertical plane passing through the optical axis and be separated transversely from this axis; the reflective mirror, in its working position, is inclined towards the secondary source with respect to the optical axis.

The secondary source can be supplied in a variable fashion: it is possible to have an electricity supply which varies according to whether a function of the DRL type is required (maximum power) or a town lamp function (reduced power): the source can thus make it possible to obtain two different functions by itself according to the way in which it is supplied (undervoltage or not).

Preferably, the angle of inclination is such that the image of the secondary source given by the reflecting mirror is directed towards the lens. It can be situated on the optical axis or in the vicinity of this optical axis, but this is not a necessary condition.

The center of the reflecting mirror is advantageously situated in the vicinity of the focus of the lens.

The secondary source can be oriented so as to directly illuminate the reflecting mirror, in particular in order to provide a secondary town lamp function, whilst the principal source is switched off.

In order to provide a secondary DRL function, the secondary source is advantageously oriented so as to illuminate in the opposite direction to the reflecting mirror, towards a fixed concave recovering mirror which reflects and concentrates the light onto the reflecting mirror.

Where the secondary source has sufficient flux to provide a secondary DRL function, it is possible to provide another town lamp secondary function by an undervolted supply of the secondary source.

The reflecting mirror can be mounted so as to rotate about an axis orthogonal to the plane passing through the optical axis and the center of the secondary source, and separated transversely from the optical axis.

The shield can be mounted so as to move, in which case the reflecting mirror can be fixed to the shield. By translation or rotation, the shield can pass from an active position corresponding to the principal function with retraction of the reflecting mirror, to an inactive position corresponding to the secondary function with reflecting mirror in the working position, and vice versa.

The invention also concerns any headlight integrating an optical module previously described.

The invention consists, apart from the provisions disclosed above, of a certain number of other provisions which will be dealt with more explicitly below with regard to example embodiments described with reference to the accompanying drawings but which are in no way limiting. In these drawings:

DESCRIPTION OF THE PREFERRED EMBODIMENTS

Figure 1:
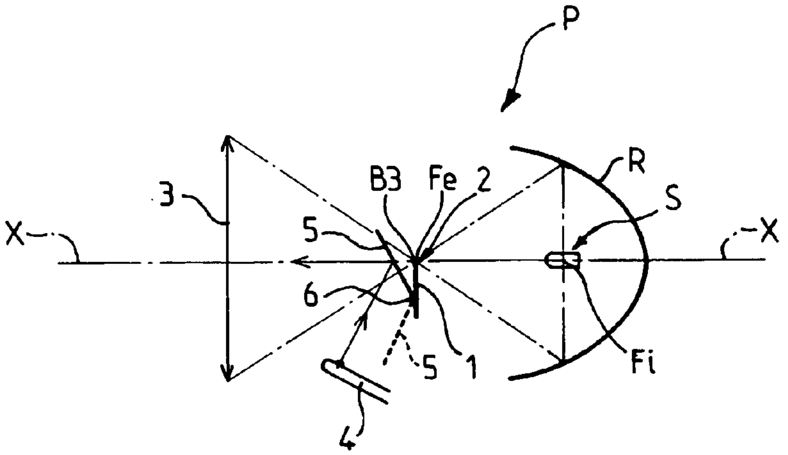
FIG. 1 is a schematic view in vertical section passing through the optical axis of an optical module with cut-off according to the invention.
Figure 2:
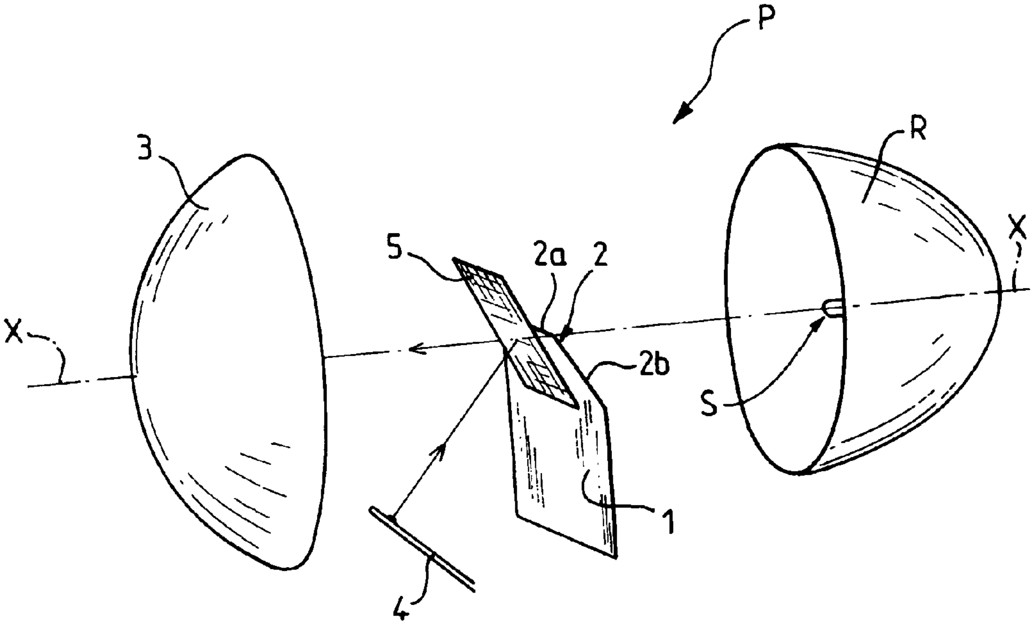
FIG. 2 is a schematic view in perspective of the optical module r of FIG. 1, when the reflecting mirror is in the working position.

Referring to FIGS. 1 and 2 of the drawings, a lighting optical module P for a motor vehicle can be seen, designed to give at least one principal lighting beam with cut-off. As an example of such a beam with cut-off, it is possible to indicate the dipped beam, which in general comprises a horizontal part on the side where vehicles pass and an oblique part rising on the opposite side, or a fog light with horizontal cut-off.

The optical module P, depicted schematically without its casing, has an optical axis X—X and comprises a reflector R of the elliptical type with an internal focus Fi and an external focus Fe on the optical axis. A principal light source S is placed in the vicinity of the internal focus Fi or at this focus.

A shield 1 is disposed in the optical module substantially perpendicular to the optical axis X—X. The shield 1 has a top cut-off edge 2, situated in the vicinity of the external focus Fe. In the example depicted in FIG. 1 and FIG. 2, the principal lighting beam is a dipped beam and the cut-off edge 2 (FIG. 2) comprises a horizontal part 2*a* situated on one side of the vertical plane passing through the optical axis and a downwardly inclined part 2*b* situated on the other side of this vertical plane.

A convergent lens 3 is situated in front of the shield and has a focal plane B3 in the vicinity of the external focus Fe or passing through this focus.

The direction of propagation of the light from the source S to the lens 3, from right to left in FIG. 1, corresponds to the “forward” direction.

A secondary light source 4 is disposed, in the direction parallel to the optical axis, between the shield 1 and the lens 3 in order to fulfill a secondary lighting function.

The optical module P comprises a retractable reflecting mirror 5. This mirror 5 can occupy a retracted position shown in a broken lines in FIG. 1, in which it does not interfere with the principal beam. In a working position, illustrated in solid lines in FIG. 1 and FIG. 2, the reflecting mirror 5 is situated in the vicinity of the focal plane of the lens, is centred on the optical axis X—X and is oriented so as to give, from the beam issuing from the secondary source 4, a substantially rectangular illuminating grid G (FIG. 4) centred on the optical axis, corresponding to the required secondary lighting function.

Figure 4:
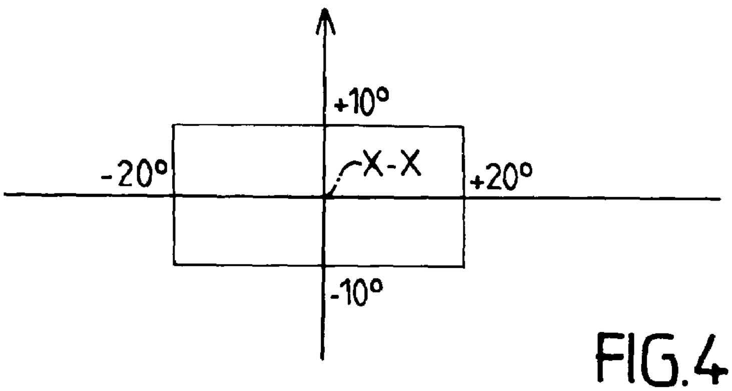
FIG. 4 is a diagram of the theoretical rectangular illumination grid for a town or DRL lamp function.

The form of the grid G of FIG. 4 corresponds to a town or daytime light (DRL) lamp function. The extent in terms of azimuth is from +20° to −20° horizontally on each side of the optical axis and, in terms of elevation angle, from −10° to +10° vertically.

According to the embodiment in FIGS. 1 and 2, the shield 1 is kept fixed in the headlight. The retractable mirror 5 is disposed in front of the shield 1 and is articulated about a horizontal axis 6, orthogonal to the optical axis X—X and situated at the bottom part according to FIG. 1. Control means (not shown) are provided for making the mirror 5 pass from the retracted position (in broken line) to the position in a solid line shown in FIG. 1.

The reflecting mirror 5 is generally a rectangular planar mirror, the large side of which is substantially horizontal, parallel to the articulation axis 6.

The secondary source has its centre situated in a vertical plane passing through the optical axis X—X and is separated transversely from this axis, towards the bottom according to the embodiment in FIGS. 1 and 2. The reflecting mirror 5, in its working position, is inclined towards the secondary source 4 in order to return the beam towards the lens 3. The angle of inclination of the mirror 5 with respect to the optical axis is preferably such that the image of the secondary source 4 is situated on the optical axis X—X or in the vicinity.

The reflecting mirror 5 must cover an angular opening, with respect to the principal object point of the lens 3 corresponding to the size of the beam. It must reproduce at the focus of the lens the size of the beam to infinity. For example, in order to obtain the illumination grid in FIG. 4, it will be necessary for the mirror 5, in the vertical direction, to cover, on each side of the horizontal plane, a height equal to:

(focal distance of the lens 3)×(tangent 10°).

The horizontal half-side of the mirror is at least equal to the focal distance multiplied by tangent 20°.

The secondary light source 4 is disposed so as not to interfere with the principal beam when the source S is switched on. According to FIGS. 1 and 2, the source 4 is situated at the bottom part and illuminates upwards in the direction of the reflecting mirror 5.

The lens 3 forms an angular image of the reflecting mirror 5 illuminated by the secondary source 4. The secondary beam created is like the distribution of illumination on the reflecting mirror 5 provided that the light reflected by the mirror 5 is collected by the lens, and this is why the reflecting mirror 5 is inclined.

Figure 5:
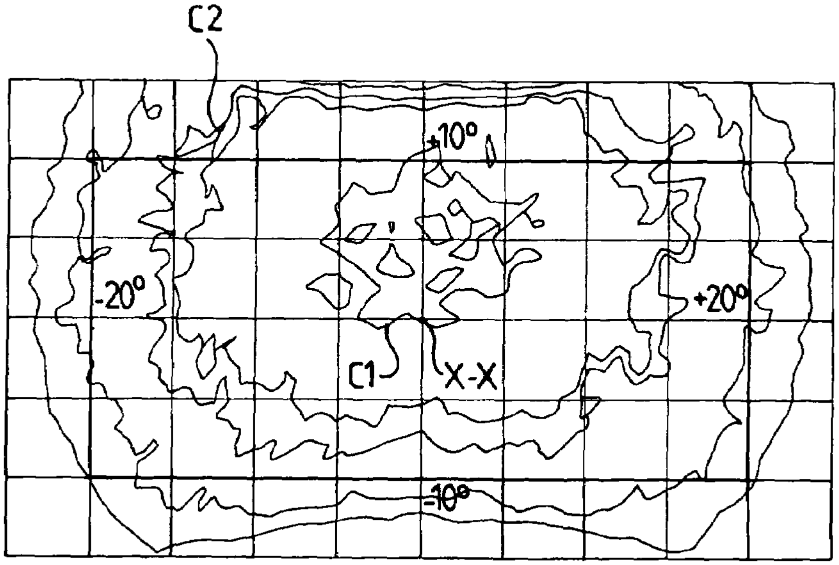
FIG. 5 is a simplified representation of isolux curves obtained for the town lamp function with the optical modules of FIGS. 1 to 3.

For a secondary town lamp or side light lamp function, it is possible to use an H6W lamp as the secondary source 4. The isolux curves obtained are illustrated schematically in FIG. 5. The curve C1 corresponds to a level of 8 cd (candelas) whilst the substantially rectangular curve C2 which surrounds the optical axis corresponds to a level of 3.6 cd. These intensities are measured on a screen situated at 10 m from the headlight comprising the optical module according to the invention, and orthogonal with respect to the optical axis.

The beam is delimited on the sides by the edge of the lens. It would be possible to have a wider beam by enclosing the reflecting mirror on the edges in order to converge on the lens 3.

The functioning of the optical module of FIGS. 1 and 2 is as follows.

When the control (not shown) for this optical module is placed in a position corresponding to the production of the principal lighting beam with cut-off, the principal source S is supplied with electrical current, the secondary source 4 is switched off and the reflecting mirror 5 is in the retracted position depicted in a broken line in FIG. 1. The light beam returned by the reflector R, coming from the source S, is cut off by the top edge 2 of the shield 1.

On a screen situated at a distance from the lens 3, the illumination will be provided below a cut-off line corresponding to the image of the edge 2 given by the lens 3.

When the control for the optical module P occupies a position corresponding to the secondary lighting function, the principal source S is switched off, the secondary source 4 is switched on and the return mirror 5 passes into the position shown in a solid line in FIG. 1 under the action of driving means (not shown) providing its rotation about the axis 6.

The light beam issuing from the source 4 and falling on the mirror 5 is directed onto the lens 3, which gives an illumination grid corresponding to the image of the mirror 5.

Figure 3:
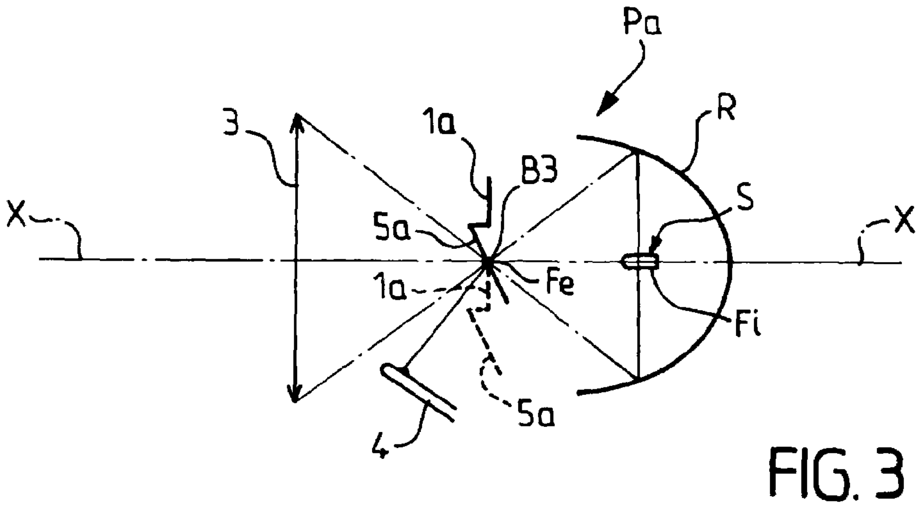
FIG. 3 is a schematic vertical section similar to FIG. 1, of a variant embodiment.

FIG. 3 illustrates a variant embodiment according to which the shield 1 a is mounted so as to move in vertical translation and the reflecting mirror 5*a* is connected to the shield 1*a*. By vertical sliding, the shield 1*a* can come into the active position illustrated in a broken line in this same figure.

By upward translation movement, the shield 1*a* is placed in an inactive position whilst the reflecting mirror 5*a* is placed in the working position illustrated in a solid line which passes exactly through the focus of the lens 3.

In a variant, the shield 1 could be mounted so as to move in rotation about a vertical axis, whilst the reflecting mirror would be offset angularly with respect to the shield whilst being connected to the shield in the rotation movement, so that, for a first angular position, the shield would be in an active position and the reflecting mirror in a retracted position, whilst in another angular position the shield would be in an inactive position and the reflecting mirror in the working position.

The functioning of the optical module of FIG. 3 is as follows.

When the driver demands the production of the principal lighting beam, the principal source S is switched on, the secondary source 4 is switched off and the shield 1*a* is placed in the active position shown in a broken line in FIG. 3 by movement means (not shown) so that the top edge of the shield 1*a* is situated in the vicinity of the focus of the lens 3.

When the secondary function is actuated, the source S is switched off whilst the source 4 is switched on and the movement means for the assembly consisting of shield 1*a* and reflecting mirror 5*a* cause an upward translation, in the example in FIG. 3. The reflecting mirror 5*a* comes to occupy the position in the solid line, the centre of the mirror being situated on the optical axis X—X. The light beam coming from the source 4 is returned by the mirror 5*a* onto the lens 3, which makes it possible to obtain a rectangular illumination grid substantially centred on the optical axis.

Figure 6:
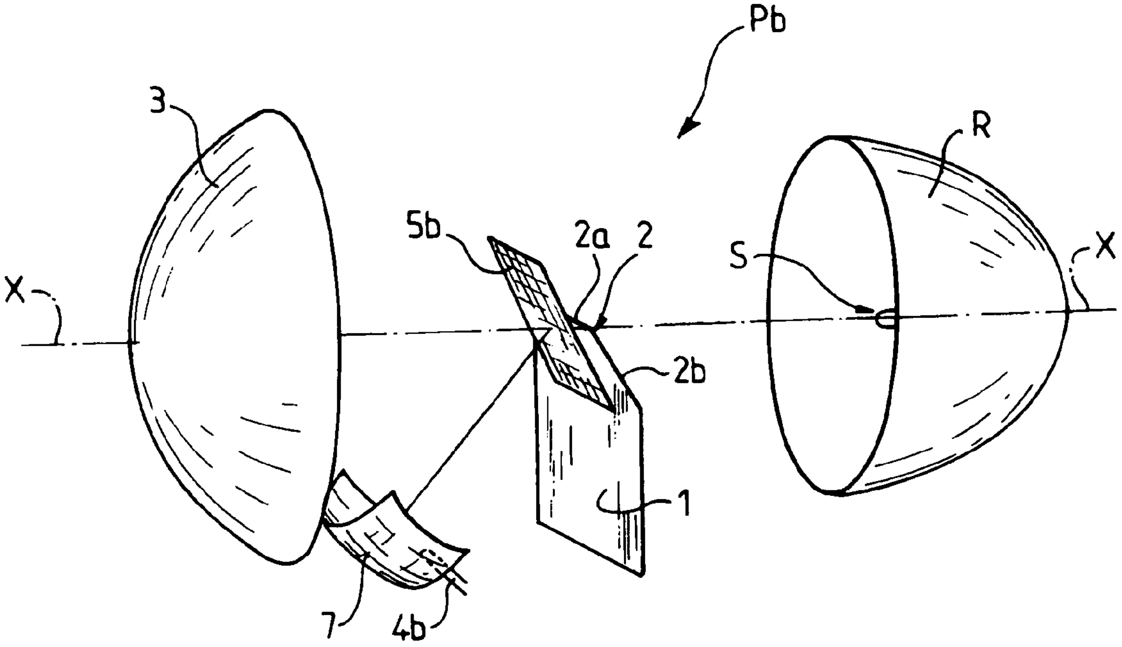
FIG. 6 is a schematic view in perspective, similar to FIG. 2, of a headlight for providing a DRL secondary function.

Referring to FIG. 6, an optical module Pb can be seen, according to the invention, which makes it possible to obtain a principal lighting beam with cut-off and a secondary lighting function of the daytime light or DRL type requiring a greater light flux than the town lamp.

The secondary source 4*b* is oriented so as to illuminate in the opposite direction to the reflecting mirror 5*b*. The retraction of the mirror 5*b* can be achieved in one of the ways disclosed previously. In FIG. 6, the reflecting mirror 5*b* is shown in its working position.

The secondary source 4*b* illuminates a fixed concave recovering mirror 7 which reflects the light, concentrating it towards the reflecting mirror 5*b:* increased efficacy necessary for the DRL function is obtained, the light being able to be refocused towards the centre of the mirror 5*b:* a more intense light beam can be obtained at the output of the lens.

The levels of illumination required for a daytime or DRL light are around 100 times greater than those required for a town lamp. The light source 4*b* is chosen with a power greater than that adopted for the town lamp function. By way of non-limiting example, the source 4*b* can consist of an H21 lamp giving a flux of approximately 600 lumens when it is supplied at nominal voltage.

The recovering mirror 7 is generally of the parabolic type and can comprise facets which create the required light distribution on the reflecting mirror 5*b*.

In the examples depicted, the secondary source 4 or 4*b* is situated in the vertical plane passing through the optical axis, below this optical axis. In a variant, the secondary source could be situated on the side, for example on the horizontal plane passing through the optical axis to the right or left of this axis, in which the case the reflecting mirror 5, 5*b* should be turned in an appropriate manner with respect to the vertical passing through its centre in order to provide correct illumination of the lens 3.

The example supplied with source 4*b* illuminating in the opposite direction to the reflecting mirror 5*b* towards a recovering mirror 7 is not limiting. In the case of a secondary source of sufficient power, the reflecting mirror 5*b* could be illuminated directly by this secondary source in order to provide the DRL function. Where applicable, a Fresnel lens could be disposed between the secondary source illuminating in the direction of the reflecting mirror 5*b* and this mirror.

It would be possible to use, as the secondary source, at least one light emitting diode (LED), subject to this diode being able to withstand the temperature prevailing inside the elliptical headlight, in particular when the principal function is being performed.

Figure 7:
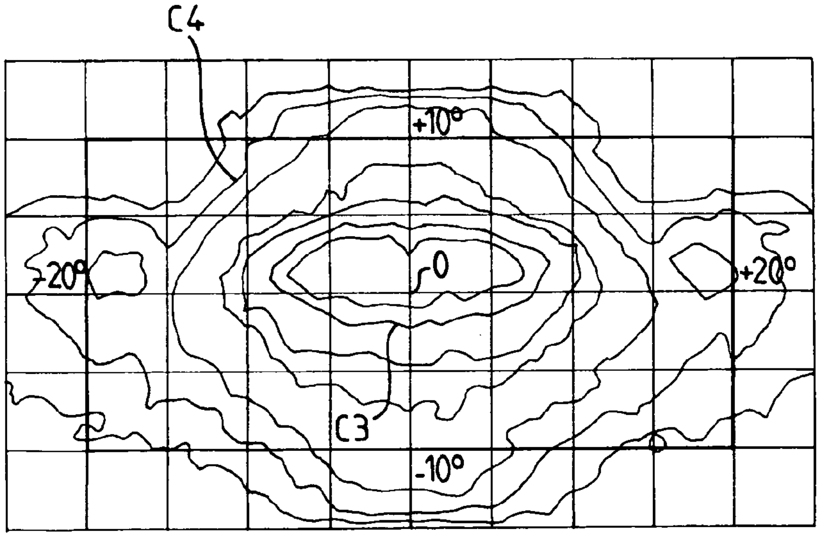
FIG. 7 depicts schematically the isolux curves obtained with the optical module of FIG. 6.

FIG. 7 depicts the isolux curves obtained on a screen with the optical module of FIG. 6. These curves are substantially centred on the point O of intersection of the optical axis with the vertical screen. The curve C4 shows that the illumination is provided in a substantially rectangular range from ±10° in terms of elevation and ±20° in terms of azimuth. The DRL or daytime light grid is similar, with regard to the shape, to that of the town lamp, only the levels of illumination being different.

It is possible, in addition to the DRL function, to provide a secondary town lamp function by supplying the secondary source 4*b* at a voltage lower than the nominal voltage. The undervoltage of the lamp 4*b* is chosen so that the flux of this lamp corresponds to that required for a town lamp. The optical module of FIG. 6 then makes it possible to fulfill three functions, namely: a principal function with beam with cut-off, and two secondary functions, respectively DRL and town lamp.

For the principal function, the reflecting mirror 5*b* is placed in a retracted position completely leaving clear the top cut-off edge of the shield, whilst the secondary source 4*b* is switched off. For fulfilling the secondary functions, the reflecting mirror 5*b* is placed in the working position, the principal source S is switched off and the secondary source 4*b* is switched on whilst being supplied either at its nominal voltage (DRL light) or being undervolted (town lamp).

What is claimed is:

1. An optical module for automobile lighting devices adapted to selectively emit a principal light beam having an optical axis, comprising:

(a) a reflector having an internal focus and an external focus on the optical axis;

(b) a principal light source disposed at or proximate to the internal focus and adapted to selectively emit light rays for performing a primary lighting function;

(c) a shield having a cut-off edge disposed at or proximate to the external focus;

(d) a lens situated in front of the shield and having a focal plane disposed at or proximate to the external focus;

(e) a secondary light source disposed between the shield and the lens and adapted to selectively emit light rays for performing a secondary lighting function; and (f) a retractable reflecting mirror movable from a retracted position, where the mirror does not substantially interfere with the principal light beam, to a working position in which the reflecting mirror is disposed at or proximate to the focal plane of the lens, substantially centered on the optical axis and oriented so as to give, from the light rays emitted from the secondary source, a secondary light beam substantially centered on the optical axis and comprising the secondary lighting function.

2. The optical module according to claim 1, wherein the secondary light beam produces a secondary lighting function having a substantially rectangular illumination grid projected on a screen disposed orthogonal to the optical axis.

3. The optical module according to claim 1, wherein the reflecting mirror is substantially planar.

4. The optical module according to claim 3, wherein the reflecting mirror is substantially rectangular.

5. The optical module according to claim 1, wherein the shield is fixed and the reflecting mirror, in its working position, is situated in front of the shield.

6. The optical module according to claim 1, wherein the shield is movable to a retracted position to allow the placing of the reflecting mirror in the working position.

7. The optical module according to claim 1, wherein the secondary source is situated in the vertical plane passing through the optical axis and is separated transversely from this axis, and the reflecting mirror, in its working position, is inclined towards the secondary source with respect to the optical axis.

8. The optical module according to claim 7, wherein in that the angle of inclination of the reflecting mirror is such that the image of the secondary source given by the reflecting mirror is directed towards the lens.

9. The optical module according to claim 1, wherein in that the center of the reflecting mirror is disposed at or proximate to the focus of the lens.

10. The optical module according to claim 1, wherein the secondary source is oriented so as to directly illuminate the reflecting mirror.

11. The optical module according to claim 1, wherein the secondary source has a variable electrical supply.

12. The optical module according to claim 1, wherein the secondary source is oriented so as to illuminate in the opposite direction to the reflecting mirror, towards a fixed concave recovering mirror which reflects and concentrates the light on the reflecting mirror.

13. The optical module according to claim 1, wherein the principal light beam emitted from the optical module comprises a dipped beam having a cut-off or a fog beam having a cut-off.

14. The optical module according to claim 1, wherein the principal light beam emitted from the optical module comprises a main beam with or without a cut-off.

15. The optical module according to claim 1, wherein the secondary function is a town and/or DRL lamp function.

16. An automobile headlight comprising an optical module according to claim 1.

* * * * *